(12) United States Patent
Kawamura et al.

(10) Patent No.: US 6,584,443 B1
(45) Date of Patent: Jun. 24, 2003

(54) APPARATUS AND METHOD FOR AUDIO DATA/AUDIO-RELATED INFORMATION TRANSFER

(75) Inventors: Akihisa Kawamura, Osaka (JP); Naoki Ejima, Osaka (JP); Masatoshi Shimbo, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/553,590

(22) Filed: Apr. 20, 2000

(30) Foreign Application Priority Data

Apr. 23, 1999 (JP) .......... 11-115885
Apr. 4, 2000 (JP) .......... 2000-102883

(51) Int. Cl.⁷ ............ G10L 19/00
(52) U.S. Cl. ....... 704/500; 704/501; 704/502; 704/503; 704/504
(58) Field of Search ............ 704/200, 500, 704/501, 502, 503, 504; 375/240

(56) References Cited

U.S. PATENT DOCUMENTS 5,228,059 A    7/1993  Takegahara et al. .......... 375/17
6,175,592 B1 * 1/2001  Kim et al. ................. 375/240

FOREIGN PATENT DOCUMENTS

CN   1084306   3/1994
CN   1205502   1/1999
JP   11331218  11/1999

OTHER PUBLICATIONS

"Digital Audio Interface" from the International Standard, CEI IEC 958, First Edition 1989–03.

* cited by examiner

Primary Examiner—Susan McFadden
(74) Attorney, Agent, or Firm—Snell & Wilmer, LLP

(57) ABSTRACT

A method for transferring audio data and audio-related information includes generating second audio data from first audio data, transmitting second audio data and audio-related information associated with the second audio data, and receiving the second audio data and audio-related information which includes information on a sampling frequency of the first audio data.

27 Claims, 6 Drawing Sheets

PRIOR ART

APPARATUS AND METHOD FOR AUDIO DATA/AUDIO-RELATED INFORMATION TRANSFER

BACKGROUND OF THE INVENTION

1. Field of the Invention

The present invention relates to a method and apparatus for digitally transferring audio data and audio-related information.

2. Description of the Related Art

As used herein, "audio data" is distinguished from "audio-related information". The "audio data" is the information representing the actual sounds to be reproduced. The "audio-related information" is defined as any information that does not directly represent the actual sounds to be reproduced, e.g., category codes, source numbers, and channel numbers.

Conventional methods for digitally transferring audio data and audio-related information are based on, for example, international standards such as IEC60958 and IEC61937.

IEC60958, which is used for transferring 2-channel linear PCM data, is used in a wide range of digital data transfer applications including CDs and DVDs. IEC61937 is used for the transfer of data other than linear PCM data, such as compressed data (e.g., data compressed according to the MPEG standards). In recent years, IEC61937 is used in applications where the multi-channel audio outputs from a DVD apparatus are utilized for reproduction by an external decoder amplifier connected to the DVD apparatus.

The aforementioned conventional methods for transferring audio data and audio-related information aim at simply reproducing the transferred audio data.

In recent years, frequencies such as 96 kHz, up to 192 kHz, are adopted as sampling frequencies for DVDs and the like.

However, the aforementioned conventional transfer standards do not support sampling frequencies such as 96 kHz and 192 kHz. Therefore, when a player is connected to an external apparatus, the original audio data is subjected to a down sampling process or the like for converting the sampling frequency to 48 kHz before transfer. In this case, however, there is a problem in that the external apparatus receiving the transferred data is not aware of the value of the sampling frequency at which the original audio data was sampled.

FIG. 5 shows an audio data transfer apparatus 100 as a consumer-use digital audio apparatus. The audio data transfer apparatus 100 includes an audio data transmitter 101 for transmitting audio data and an audio data receiver 102 for receiving the transmitted audio data, the transmitter 101 and the receiver 102 being interconnected via an audio data transfer interface 103 designed for audio data transfer.

Tables 1 and 2 show transfer conditions for transferring audio data from the audio data transmitter 101 in the aforementioned audio data transfer apparatus 100.

TABLE 1

| Signal processing or date transfer processing | Sampling frequency of transferred data | Monitoring frequency at the receiving end |
| --- | --- | --- |
| down-sampling | sampling frequency after down-sampling | sampling frequency after down-sampling |

TABLE 1-continued

| Signal processing or date transfer processing | Sampling frequency of transferred data | Monitoring frequency at the receiving end |
| --- | --- | --- |
| up-sampling | sampling frequency after up-sampling | sampling frequency after up-sampling |
| sampling conversion | sampling frequency after sampling conversion | sampling frequency after sampling conversion |
| N times speed transfer | original sampling frequency | N times |
| 1/N times speed transfer | original sampling frequency | 1/N times |

TABLE 2

| Signal processing or data transfer processing | Monitoring ability |
| --- | --- |
| down-sampling | possible |
| up-sampling | possible |
| sampling conversion | possible |
| N times speed transfer | impossible |
| 1/N times speed transfer | impossible |

As shown in Table 1, the transfer conditions for the audio data transfer apparatus 100 include up-sampling, down-sampling, sampling conversion, N times speed transfer, 1/N times speed transfer, etc., in addition to transferring the original audio data at the originally-intended speed.

Under up-sampling, down-sampling, sampling conversion conditions, the sampling frequency of the transferred audio data differs from that of the original audio data. However, the audio-related information which is transferred In the conventional audio data transfer apparatus 100 does not include information concerning the sampling frequency of the original audio data. As a result, there is a problem in that the audio data receiver 102 cannot obtain any information concerning the sampling frequency of the original audio data.

Under conditions where audio data is transferred at an N times transfer speed or a 1/N times transfer speed, the sampling frequency of the original audio data is retained; however, the audio data receiver 102 cannot monitor the transferred data as it is (see Table 2). In order to properly monitor the audio data transferred under N times transfer or 1/N times transfer conditions, it is necessary to reproduce the audio data at an N times or 1/N times speed, or to reproduce the audio data at the sampling frequency of the original audio data while storing the transferred audio data in large memories. In the case of non-PCM data, subjecting the transferred data to a decoding process which does not involve some special measures would result in the audio information being reproduced with unwanted interruptions because the audio data receiver 102 often cannot perform the decoding process in time.

FIG. 6 illustrates an example of a conventional audio data/audio-related information recording format 300. As shown in FIG. 6, the conventional audio data/audio-related information recording format 300 contains no information indicating the sampling frequency of the original audio data or no information indicating the transfer speed of the transferred audio data. Hence, it is impossible for the audio data receiver 102 to detect the sampling frequency of the original audio data or the transfer speed of the transferred audio data.

SUMMARY OF THE INVENTION

According to one aspect of the present invention, there is provided a method for transferring audio data and audio-related information, comprising: a generation step of generating second audio data from first audio data; a transmission step of transmitting the second audio data and audio-related information associated with the second audio data; and a reception step of receiving the second audio data and the audio-related information, wherein the audio-related information includes information representing a sampling frequency of the first audio data.

In one embodiment of the invention, the transmission step comprises a conversion step of converting the sampling frequency of the first audio data into a sampling frequency which is suitable for reproduction at the reception step.

In another embodiment of the invention, the conversion step comprises a down-sampling.

In still another embodiment of the invention, the conversion step comprises an up-sampling.

In still another embodiment of the invention, the conversion step comprises a sampling conversion.

In still another embodiment of the invention, the reception step comprises displaying the sampling frequency of the first audio data on a display.

Alternatively, there is provided a method for transferring audio data and audio-related information, comprising: a transmission step of transmitting the audio data and audio-related information associated with the audio data; and a reception step of receiving the audio data and the audio-related information, wherein the audio-related information includes monitor information indicating whether or not the audio data is capable of being monitored in the reception step.

In one embodiment of the invention, the reception step comprises displaying the monitor information on a display.

In another embodiment of the invention, the method further comprises a muting step of muting the audio data if the monitor information indicates that the audio data is not capable of being monitored in the reception step.

Alternatively, there is provided a method for transferring audio data and audio-related information, comprising: a transmission step of transmitting the audio data and audio-related information associated with the audio data; and a reception stop of receiving the audio data and the audio-related information, wherein the audio-related information includes information representing a transfer speed of the audio data.

In one embodiment of the invention, the reception step comprises displaying the transfer speed on a display.

According to another aspect of the present invention, there is provided an audio data/audio-related information transfer apparatus for transferring audio data and audio-related information, comprising: a transmitter for transmitting second audio data and audio-related information associated with the second audio data, the second audio data being generated from first audio data; and a receiver for receiving the second audio data and the audio-related information, wherein the audio-related information includes information representing a sampling frequency of the first audio data.

In one embodiment of the invention, the transmitter converts the sampling frequency of the first audio data into a sampling frequency which is suitable for reproduction by the receiver.

In another embodiment of the invention, wherein the transmitter performs a down-sampling for the sampling frequency of the first audio data.

In still another embodiment of the invention, the transmitter performs an up-sampling for the sampling frequency of the first audio data.

In still another embodiment of the invention, the transmitter performs a sampling conversion for the sampling frequency of the first audio data.

In still another embodiment of the invention, the receiver comprises a display for displaying the sampling frequency of the first audio data.

Alternatively, there is provided an audio data/audio-related information transfer apparatus for transferring audio data and audio-related information, comprising: a transmitter for transmitting audio data and audio-related information associated with the audio data; and a receiver for receiving the audio data and the audio-related information, wherein the audio-related information includes monitor information indicating whether or not the audio data is capable of being monitored by the receiver.

In one embodiment of the invention, the receiver comprises a display for displaying the monitor information.

In another embodiment of the invention, the audio data is muted if the monitor information indicates that the audio data is not capable of being monitored by the receiver.

Alternatively, there is provided an audio data/audio-related information transfer apparatus for transferring audio data and audio-related information, comprising: a transmitter for transmitting audio data and audio-related information associated with the audio data; and a receiver for receiving the audio data and the audio-related information, wherein the audio-related information includes information representing a transfer speed of the audio data.

In one embodiment of the invention, the receiver comprises a display for displaying the transfer speed.

According to another aspect of the present invention, there is provided a transmitter for transmitting second audio data and audio-related information associated with the second audio data, the second audio data being generated from first audio data, wherein the audio-related information includes information representing a sampling frequency of the first audio data.

In one embodiment of the invention, the transmitter converts the sampling frequency of the first audio data into a sampling frequency which is suitable for reproduction by the receiver.

In another embodiment of the invention, the transmitter performs a down-sampling for the sampling frequency of the first audio data.

In still another embodiment of the invention, the transmitter performs an up-sampling for the sampling frequency of the first audio data.

In still another embodiment of the invention, the transmitter performs a sampling conversion for the sampling frequency of the first audio data.

According to another aspect of the present invention, there is provided a transmitter for transmitting audio data and audio-related information associated with the audio data, wherein the audio-related information includes monitor information indicating whether or not the audio data is capable of being monitored by the receiver.

Alternatively, there is provided a transmitter for transmitting audio data and audio-related information associated with the audio data, wherein the audio-related information includes information representing a transfer speed of the audio data.

According to another aspect of the present invention, there is provided a receiver for receiving second audio data and audio-related information associated with the second audio data, the second audio data being generated from first audio data and transmitted from a transmitter, wherein the audio-related information includes information representing a sampling frequency of the first audio data.

In one embodiment of the invention, the receiver comprises a display for displaying the sampling frequency of the first audio data.

Alternatively, there is provided a receiver for receiving audio data and audio-related information associated with the audio data, wherein the audio-related information includes monitor information Indicating whether or not the audio data is capable of being monitored by the receiver.

In one embodiment of the invention, the receiver comprises a display for displaying the monitor information.

In another embodiment of the invention, the audio data is muted if the monitor information indicates that the audio data is not capable of being monitored by the receiver.

Alternatively, there is provided a receiver for receiving audio data and audio-related information associated with the audio data, the audio data being transmitted from a transmitter, wherein the audio-related information includes information representing a sampling frequency of the first audio data.

In one embodiment of the invention, the receiver comprises a display for displaying the transfer speed.

Thus, the invention described herein makes possible the advantage of providing a method and apparatus for performing digital transfer of audio data which involves concurrently transferring information indicating a sampling frequency, monitoring ability, and a transfer speed of audio data, thereby enabling a mode of audio reproduction which is in accordance with the particular audio data that is being transferred.

This and other advantages of the present invention will become apparent to those skilled in the art upon reading and understanding the following detailed description with reference to the accompanying figures.

DESCRIPTION OF THE PREFERRED EMBODIMENTS

The present invention will be described with respect to an audio data transfer method in accordance with the IEC 60958 or IEC61937 transfer standards, with reference to the accompanying figures.

As for the details of the IEC 60958 and IEC61937 transfer standards, see Interface for Non-linear PCM Encoded Audio Bitstreams Applying IEC61937, for example.

Figure 1:
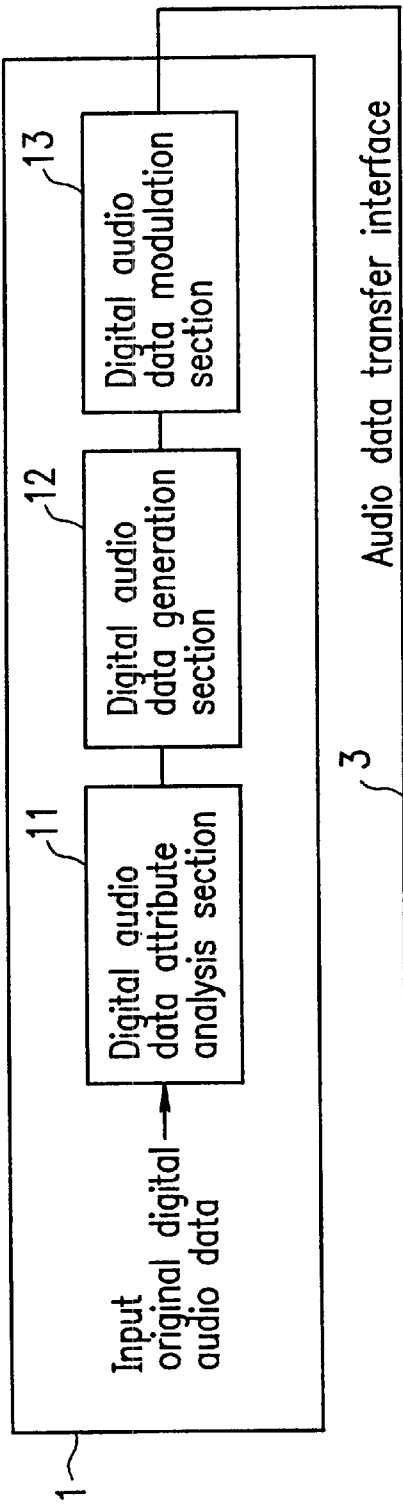
FIG. 1 is a block diagram illustrating an audio data transfer apparatus according to an example of the present invention.
Figure 1:
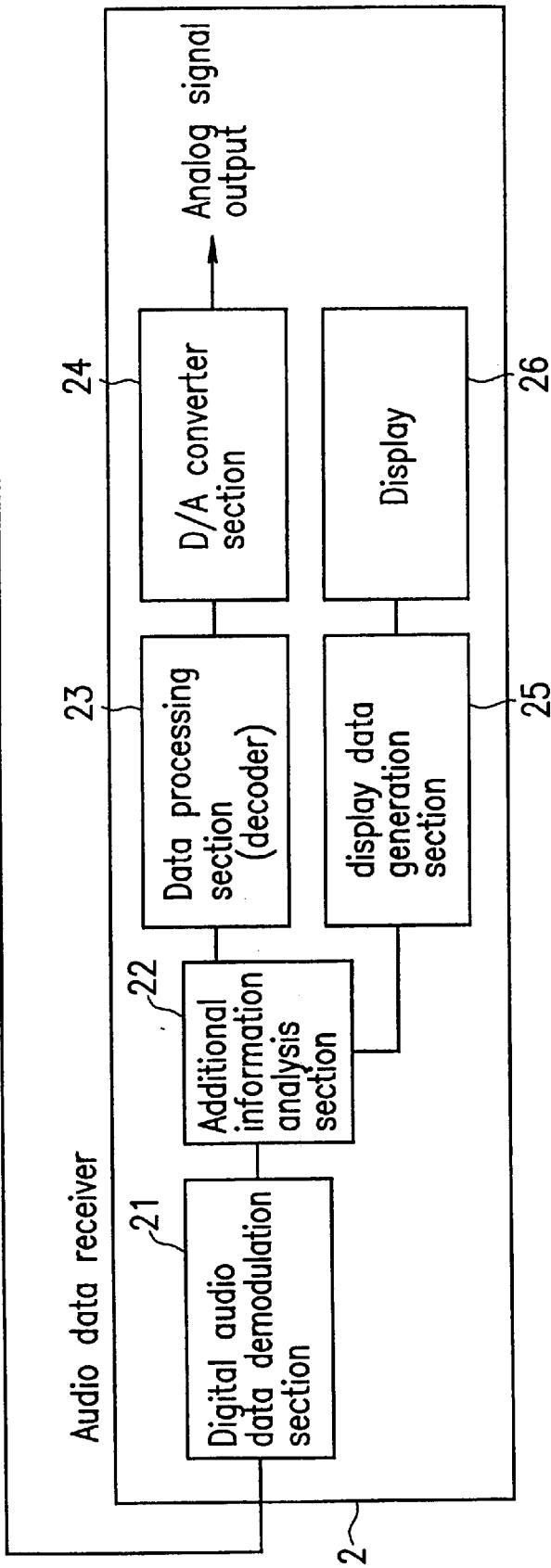

FIG. 1 illustrates an audio data transfer apparatus 10 according to an example of the present invention. The audio data transfer apparatus 10 includes an audio data transmitter 1 for transmitting audio data and an audio data receiver 2 for receiving the transmitted audio data, the audio data transmitter 1 and the audio data receiver 2 being interconnected via an audio data transfer interface 3 designed for audio data transfer. The audio data transmitter 1 may be a DVD player or a set top box (STB), for example. The audio data receiver 2 may be an AV decoder or a minidisk apparatus, for example. The audio data transfer interface 3 may be a conductive cable or an optical fiber, for example.

In accordance with the audio data transfer apparatus 10, audio data is first analyzed by a digital audio data attribute analysis section 11. Then, a digital audio data generation section 12 adds appropriate audio-related information to the audio data (described below). Thereafter, the audio data is modulated by a digital audio data modulation section 13, and output to the audio data transfer interface 3 so as to be transferred to the audio data receiver 2.

Figure 2:
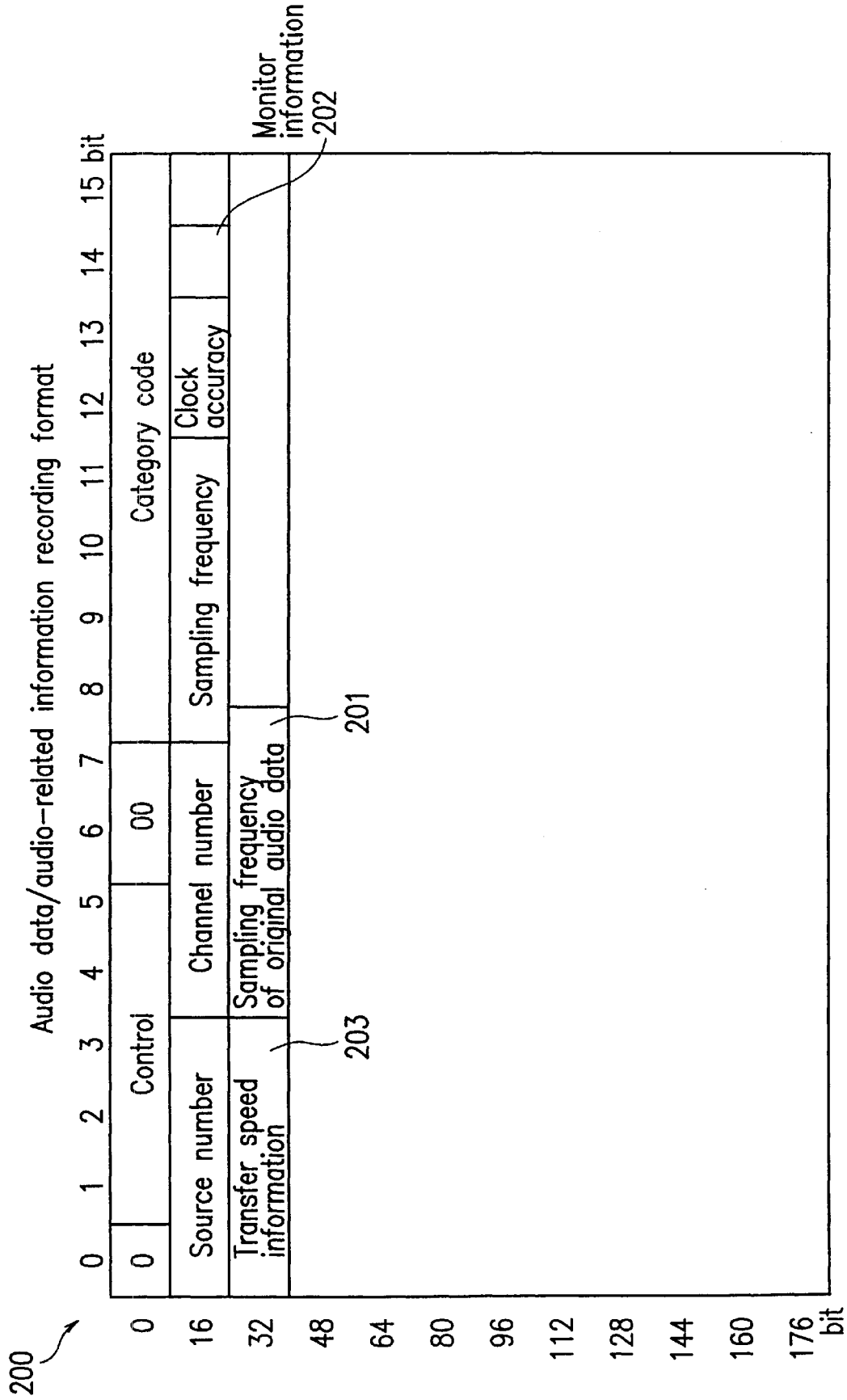
FIG. 2 is a diagram illustrating an audio data/audio-related information recording format according to an example of the present invention.

FIG. 2 illustrates an audio data/audio-related information recording format 200 according to an example of the present invention.

In the audio data/audio-related information recording format 200 shown in FIG. 2, sampling frequency data of the original audio data are assigned in a region 201 spanning the 36th to 39th bits. Table 3 shows the correspondence between the sampling frequency of the original audio data and bit information.

TABLE 3

| Sampling frequency data of original audio data | |
| --- | --- |
| bit 36 (LSB) - bit 39 (MSB) | sampling frequency |
| "0000" | 44.1 kHz |
| "0001" | 22.05 kHz |
| "0010" | 88.2 kHz |
| "0100" | 48 kHz |
| "0101" | 24 kHz |
| "0100" | 96 kHz |
| "1100" | 32 kHz |
| "1101" | 16 kHz |
| "1110" | 64 kHz |
| others | undefined |

In Table 3, nine sampling frequency values are assigned as the sampling frequency for original audio data: sampling frequencies which are currently in common use (i.e., 32 kHz, 44.1 kHz, and 48 kHz); frequencies twice those values (i.e., 64 kHz, 88.2 kHz, and 96 kHz), and frequencies half those values (i.e., 16 kHz, 22.05 kHz, and 24 kHz).

Since the audio data/audio-related information recording format 200 (FIG. 2) includes information representing the sampling frequency of the original audio data as illustrated in Table 3, it is possible for the audio data receiver 2 to detect the sampling frequency of the original audio data even in the case where the audio data to be transferred are down-sampled from the sampling frequencies 96 kHz and 88.2 kHz, which are adopted by the DVD audio standards. Moreover, the audio data/audio-related information recording format 200 (FIG. 2) also supports half-rate frequencies of the MPEG2 frequencies, which are adopted by digital satellite broadcast. Even in the case where the audio data to be transferred are up-sampled from such frequencies, it is possible for the audio data receiver 2 to detect the audio-related information associated with the original audio data.

In the audio data/audio-related information recording format 200 (FIG. 2), monitor information is assigned in a region 202 at bit 30. For example, the monitor information can be expressed by one bit as shown in Table 4.

TABLE 4

Examples of monitor bits

| bit 30 | Monitoring ability |
|---|---|
| "1" | possible |
| "0" | impossible |

The audio data transmitter 1 sets bit 30 to "1" if it is possible to monitor the audio data, and sets bit 30 to "0" if monitoring ability is not guaranteed (e.g., if it is impossible to monitor the audio data).

Furthermore, in the audio data/audio-related information recording format 200 shown in FIG. 2, transfer speed information is assigned in a region 203 spanning the 32nd to 35th bits. The transfer speed information may be expressed by four bits as shown in Table 5, for example.

TABLE 5

| bit 32 (LSB) - bit 35 (MSB) | transfer speed |
|---|---|
| "0000" | 4 times |
| "0001" | 2 times |
| "0010" | 1 time |
| "0100" | ½ times |
| "0101" | ¼ times |

Since the audio data/audio-related information recording format 200 (FIG. 2) includes information representing the transfer speed information as illustrated in Table 5, it is possible for the audio data receiver 2 to detect the transfer speed of audio data even in the case where the audio data is transferred at an N times or 1/N times speed. In the case where the audio data receiver 2 includes a data processing means which is capable of reproducing audio data at varying speeds, it is possible to vary the reproduction speed of the received audio data on the basis of the detected transfer speed information.

Although Table 5 illustrates 4 times to ¼ times transfer speeds, the present invention is applicable to any transfer speed.

Referring back to FIG. 1, the audio data, as well as audio-related information including the aforementioned additional information (e.g., sampling frequency information and transfer speed information), is transferred to the audio data receiver 2 in accordance with the audio data transfer apparatus 10.

In the audio data receiver 2, the received audio data and audio-related information in demodulated by a digital audio data demodulation section 21, and the audio-related information is analyzed by an additional information analysis section 22. Then, after the audio data is processed by a data processing section 23, the audio data is converted into an analog signal by a D/A converter section 24 for output. A display data generation section 25 generates display data based on the audio-related information, which is displayed on a display 26.

Figure 3:
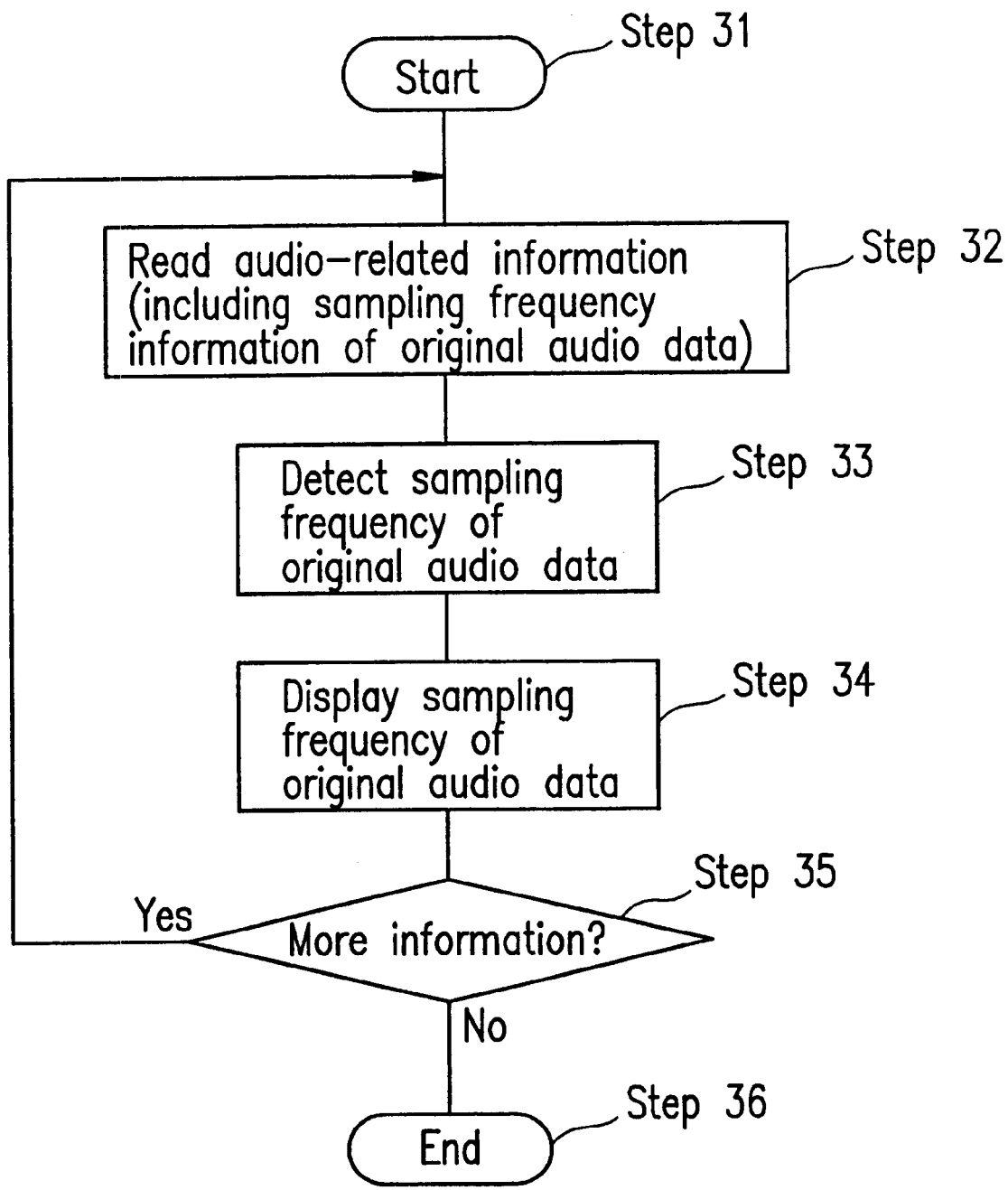
FIG. 3 is a flowchart illustrating a flow of steps performed during original audio data sampling frequency information processing according to an example of the present invention.

FIG. 3 is a flowchart showing a flow of steps for a processing of the sampling frequency information of original audio data which is performed by the audio data receiver 2.

At Step 32, audio-related information including the sampling frequency information of original audio data to read by an additional information analysis section 22 of the audio data receiver 2. Next, at Step 33, the additional information analysis section 22 looks up in Table 3 the bit information representing the sampling frequency of the original audio data that has been read, thereby detecting the sampling frequency of the original audio data. At Step 34, the display data generation section 25 displays the detected sampling frequency of the original audio data on the display 26.

Figure 4:
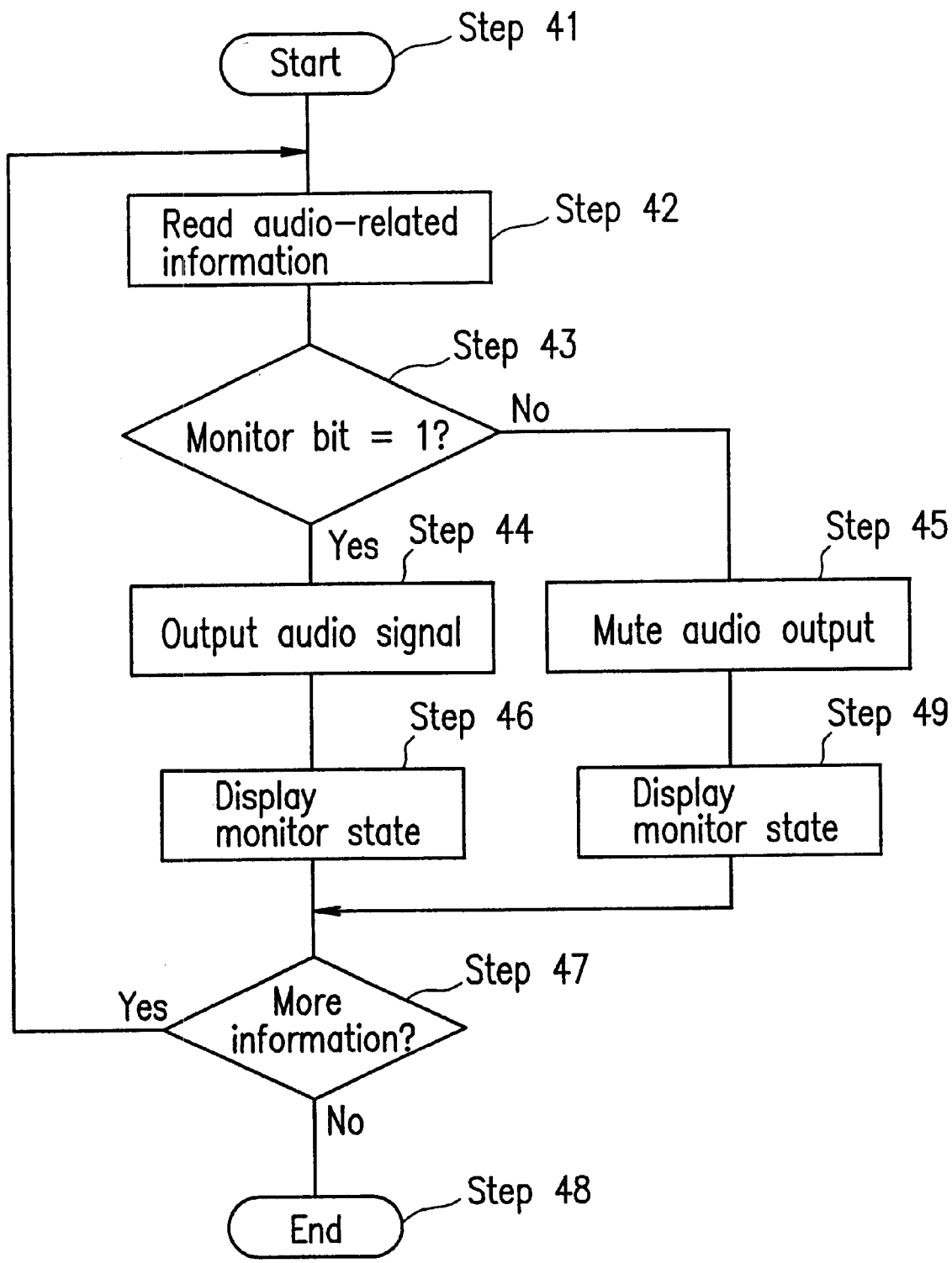
FIG. 4 is a flowchart illustrating a flow of steps during monitor information processing according to an example of the present invention.
Figure 5:
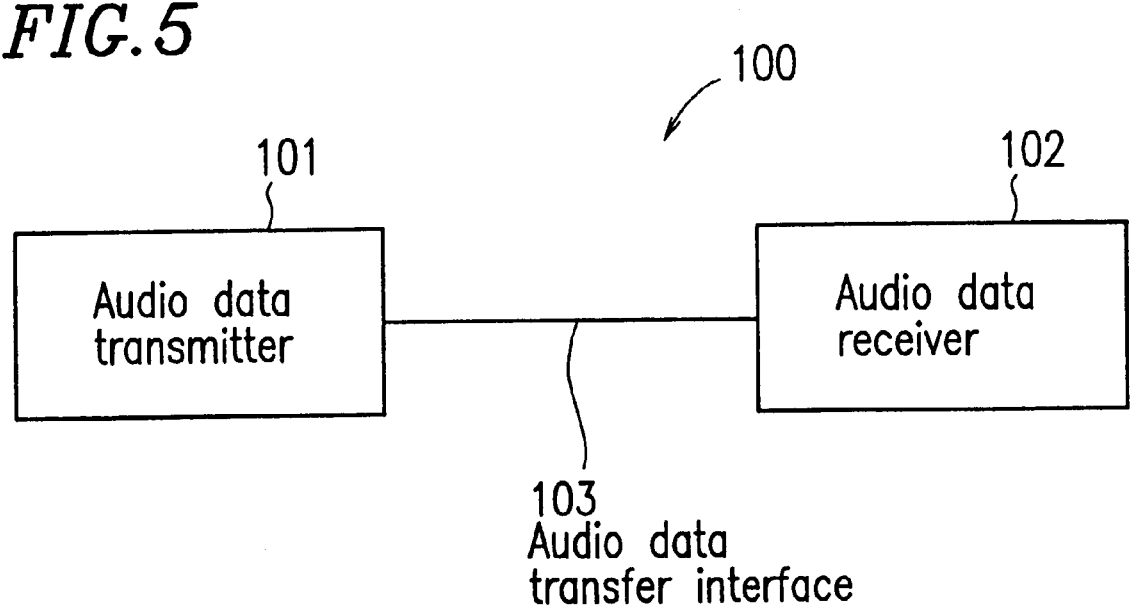
FIG. 5 In a block diagram illustrating a conventional audio data transfer apparatus.
Figure 6:
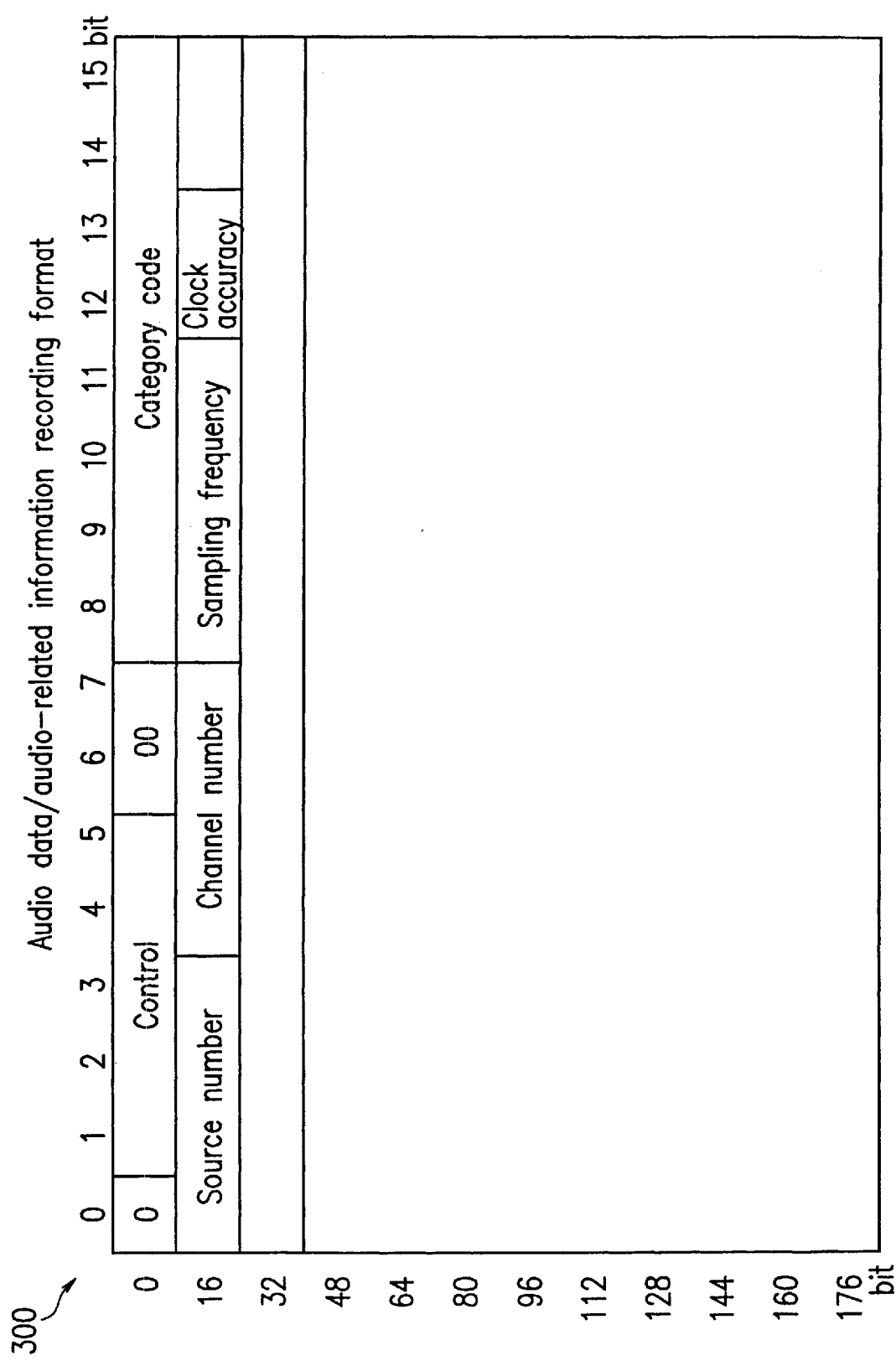
FIG. 6 is a diagram illustrating a conventional audio data/audio-related information recording format.

FIG. 4 is a flowchart showing the monitor information processing performed in the audio data receiver 2. Specifically, FIG. 4 illustrates monitor information processing performed in the case where the audio-related information does not include transfer speed information, or where the audio data receiver 2 does not include a data processing means which is capable of reproducing audio data at varying speeds.

At Step 42, audio-related information including the monitor information of original audio data is read by the additional information analysis section 22 of the audio data receiver 2. Next, at Step 43, the additional information analysis section 22 detects or determines whether or not the monitor bit (e.g., bit 30) is "1", if the monitor bit is "1", it is possible to monitor the audio data, so that the transferred data is subjected to appropriate signal processing at the data processing section 23 and the D/A converter section 24, and thereafter output as audio data at step 44. Next, at Step 46, the display 26 displays information indicating that the audio data can be monitored or in being monitored.

On the other hand, in the case where the audio data is transferred at an increased speed (N times speed) or at a decreased speed (1/N times speed), it is impossible to detect what multiples of the original frequency the data is being transferred at. In such cases, the audio data transmitter 1 transmits "0" as the monitor bit to indicate that the audio data cannot be monitored. When the monitor information indicating that monitoring is impossible is read by the additional information analysis section 22 in the audio data receiver 2, the audio output is muted at Step 45, and the display 26 displays information indicating that the audio data cannot be monitored or is being muted at Step 49.

In the case where the audio-related information includes transfer speed information, the transfer speed information is analyzed by the additional information analysis section 22, and the transfer speed is displayed on the display 26.

In the case where the audio data receiver 2 includes a data processing means which is capable of reproducing audio data at varying speeds, the speed of the audio data is changed based on the detected transfer speed information, and the audio data is reproduced at the changed speed.

The present invention has been described above with respect to certain embodiments. The sampling frequency information, the monitor information, and the transfer speed information of the original audio data may all be included in the audio data/audio-related information recording format 200. Alternatively, each type of information may be selectively included depending on the needs of the particular application. For example, the audio data/audio-related information recording format 200 may only include the sampling frequency information of the original audio data.

The audio data/audio-related information recording format 200 described above is only illustrative. Any other format may be employed as the audio data/audio-related information recording format 200.

Although the audio data transfer according to the above example of the present invention is achieved via an audio data transfer interface 3, audio data may be transferred by any other transfer means that is capable of transferring digital information. For example, it is possible to transfer audio data via a radio transmission/reception means.

The present invention is applicable not only to the IEC 60958 and IEC61937 transfer standards but also any digital data transfer standards, e.g., IEEE 1394, which is a set of audio video data transfer standards to be enforced in future.

As described above, according to the present invention, an audio data transmitter adds, to audio data to be transferred, information indicating a sampling frequency of the original audio data, monitoring ability (indicating whether or not it is possible to monitor the transferred audio data at an audio data receiver), and a transfer speed of audio data. As a result, various information concerning the transferred data can be detected by the audio data receiver. This enables a mode of audio reproduction which is in accordance with the particular audio data that is being transferred.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for transferring audio data and audio-related information, comprising:
   a generation step of generating second audio data from first audio data;
   a transmission step of transmitting the second audio data and audio-related information associated with the second audio data; and
   a reception step of receiving the second audio data and the audio-related information,
   wherein the audio-related information includes information representing a sampling frequency of the first audio data.

2. A method according to claim 1, wherein the transmission step comprises a conversion step of converting the sampling frequency of the first audio data into a sampling frequency which is suitable for reproduction at the reception step.

3. A method according to claim 2, wherein the conversion step comprises a down-sampling.

4. A method according to claim 2, wherein the conversion stop comprises an up-sampling.

5. A method according to claim 2, wherein the conversion step comprises a sampling conversion.

6. A method according to claim 1, wherein the reception step comprises displaying the sampling frequency of the first audio data on a display.

7. A method for transferring audio data and audio-related information, comprising:
   a transmission step of transmitting the audio data and audio-related information associated with the audio data; and
   a reception step of receiving the audio data and the audio-related information,
   wherein the audio-related information includes monitor information indicating whether or not the audio data is capable of being monitored in the reception step.

8. A method according to claim 7, wherein the reception step comprises displaying the monitor information on a display.

9. A method according to claim 7, further comprising a muting step of muting the audio data if the monitor information indicates that the audio data is not capable of being monitored in the reception step.

10. A method for transferring audio data and audio-related information, comprising:
    a transmission step of transmitting the audio data and audio-related information associated with the audio data: and
    a reception step of receiving the audio data and the audio-related information,
    wherein the audio-related information includes information representing a transfer speed of the audio data.

11. A method according to claim 10, wherein the reception step comprises displaying the transfer speed on a display.

12. A audio data/audio-related information transfer apparatus for transferring audio data and audio-related information, comprising:
    a transmitter for transmitting second audio data and audio-related information associated with the second audio data, the second audio data being generated from first audio data; and
    a receiver for receiving the second audio data and the audio-related information,
    wherein the audio-related information includes information representing a sampling frequency of the first audio data.

13. A audio data/audio-related information transfer apparatus according to claim 12,
    wherein the transmitter converts the sampling frequency of the first audio data into a sampling frequency which is suitable for reproduction by the receiver.

14. A audio data/audio-related information transfer apparatus according to claim 13, wherein the transmitter performs a down-sampling for the sampling frequency of the first audio data.

15. A audio data/audio-related information transfer apparatus according to claim 13, wherein the transmitter performs an up-sampling for the sampling frequency of the first audio data.

16. A audio data/audio-related information transfer apparatus according to claim 13, wherein the transmitter performs a sampling conversion for the sampling frequency of the first audio data.

17. A audio data/audio-related information transfer apparatus according to claim 12, wherein the receiver comprises a display for displaying the sampling frequency of the first audio data.

18. A audio data/audio-related information transfer apparatus for transferring audio data and audio-related information, comprising:
    a transmitter for transmitting audio data and audio-related information associated with the audio data; and
    a receiver for receiving the audio data and the audio-related information,
    wherein the audio-related information includes monitor information indicating whether or not the audio data is capable of being monitored by the receiver.

19. A audio data/audio-related information transfer apparatus according to claim 18, wherein the receiver comprises a display for displaying the monitor information.

20. A audio data/audio-related information transfer apparatus according to claim 18, wherein the audio data is muted if the monitor information indicates that the audio data is not capable of being monitored by the receiver.

21. A audio data/audio-related information transfer apparatus for transferring audio data and audio-related information, comprising:

a transmitter for transmitting audio data and audio-related information associated with the audio data; and a receiver for receiving the audio data and the audio-related information, wherein the audio-related information includes information representing a transfer speed of the audio data.

22. A audio data/audio-related information transfer apparatus according to claim 21, wherein the receiver comprises a display for displaying the transfer speed.

23. A transmitter for transmitting second audio data and audio-related information associated with the second audio data, the second audio data being generated from first audio data, wherein the audio-related information includes information representing a sampling frequency of the first audio data.

24. A transmitter according to claim 23, wherein the transmitter converts the sampling frequency of the first audio data into a sampling frequency which is suitable for reproduction by the receiver.

25. A transmitter according to claim 24, wherein the transmitter performs a down-sampling for the sampling frequency of the first audio data.

26. A transmitter according to claim 24, wherein the transmitter performs an up-sampling for the sampling frequency of the first audio data.

27. A transmitter according to claim 24, wherein the transmitter performs a sampling conversion for the sampling frequency of the first audio data.

* * * * *

UNITED STATES PATENT AND TRADEMARK OFFICE
CERTIFICATE OF CORRECTION

PATENT NO.    : 6,584,443 B1
DATED         : June 24, 2003
INVENTOR(S)   : Kawamura et al.

It is certified that error appears in the above-identified patent and that said Letters Patent is hereby corrected as shown below:

<u>Column 9,</u>
Line 51, delete "stop" and insert -- step -- therefore.

Signed and Sealed this

Twenty-first Day of October, 2003

JAMES E. ROGAN
*Director of the United States Patent and Trademark Office*